March 24, 1964   C. C. COLE   3,126,075
BRAKE MECHANISM FOR A MISSILE DOLLY
Original Filed Jan. 16, 1958   3 Sheets-Sheet 1

INVENTOR.
CLYDE C. COLE
BY
George J. Rubens
ATTORNEY

March 24, 1964  C. C. COLE  3,126,075
BRAKE MECHANISM FOR A MISSILE DOLLY
Original Filed Jan. 16, 1958  3 Sheets-Sheet 2
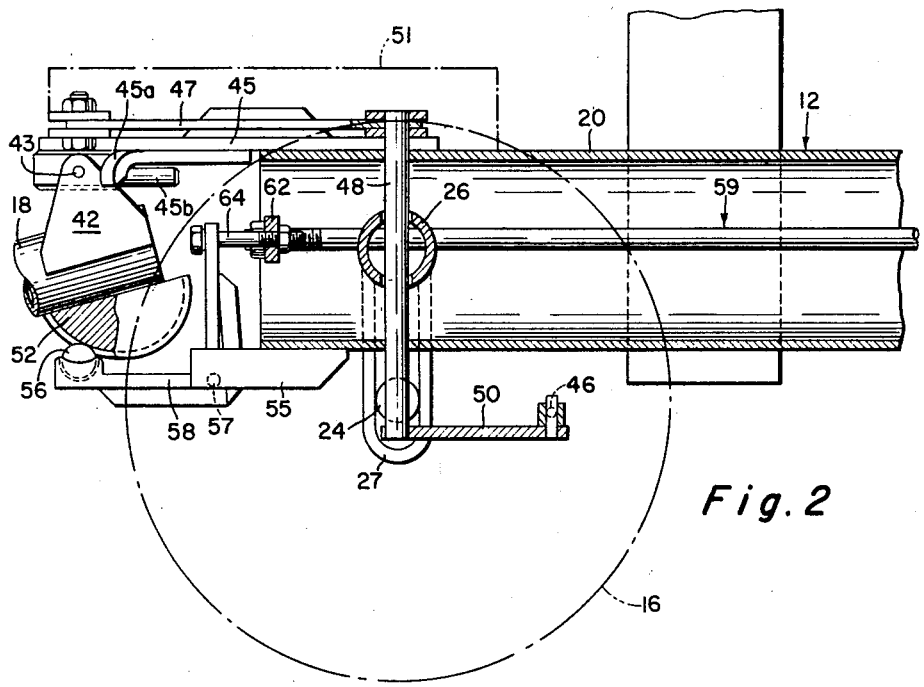
Fig. 2
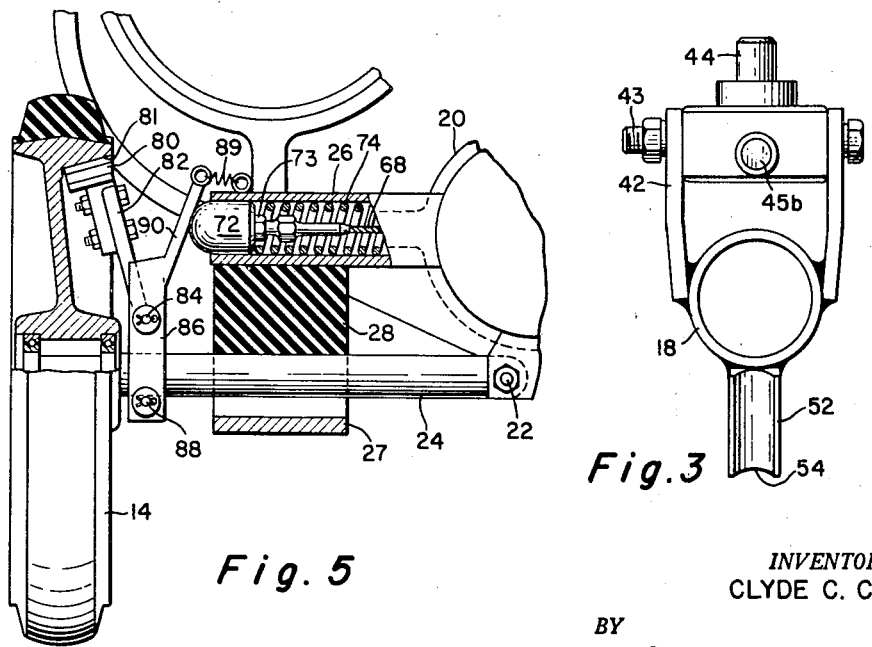
Fig. 5
Fig. 3
INVENTOR.
CLYDE C. COLE
BY
George J. Rubens
ATTORNEY March 24, 1964     C. C. COLE     3,126,075
BRAKE MECHANISM FOR A MISSILE DOLLY
Original Filed Jan. 16, 1958     3 Sheets-Sheet 3

INVENTOR.
CLYDE C. COLE
BY
*George J. Ruber*
ATTORNEY

United States Patent Office 3,126,075
Patented Mar. 24, 1964

3,126,075
BRAKE MECHANISM FOR A MISSILE DOLLY
Clyde C. Cole, 5298 Harvard, Ventura, Calif.
Original application Jan. 16, 1958, Ser. No. 709,427, now Patent No. 3,005,640, dated Oct. 24, 1961. Divided and this application Aug. 21, 1961, Ser. No. 132,991
3 Claims. (Cl. 188—119)
(Granted under Title 35, U.S. Code (1952), sec. 266)

The invention described herein may be manufactured and used by or for the Government of the United States of America for governmental purposes without the payment of any royalties thereon or therefor.

This invention relates to article-transporting equipment, and more particularly to a brake mechanism for a dolly capable of transporting one or more missiles in a safe and expedient manner and in an unstable environment. This application is a division of my U.S. patent application, Serial No. 709,427 filed January 16, 1958 which matured into U.S. Patent No. 3,005,640.

Shipboard transportation of missiles from a magazine or ready-service area to the launcher, i.e., an aircraft, presents a serious stability problem not generally found in land transportation. The pitching and rolling of a ship's deck requires a dolly that will be braked to a secured position whenever it is intentionally or accidentally left unattended, especially under battle conditions as the dolly operator is in an unprotected position and readily incapacitated. Other factors reside in facilitating the transfer of the missiles from a storage position to a dolly transporting position, and from the dolly to the launching aircraft.

According to the present invention the dolly comprises a chassis having front wheels controlled by a steering arm. The dolly is provided with a braking system actuated and controlled by the relative position of the steering arm. The braking assembly is so arranged and constructed that the brakes will be applied automatically whenever the steering arm is positioned in either of two predetermined elevation zones, one on each side of a normal towing zone. Each chassis wheel is independently suspended to the frame, and the brake shoe assembly is designed to apply a continuous braking force to the wheel in any vertical position thereof. The chassis frame consists preferably of a longitudinal tubular beam from which is suspended the axes of the front and rear wheels, and on which is mounted a plurality of article or missile supports. Employment of a single longitudinal frame beam permits the supports to be readily adjusted longitudinally to accommodate articles of different lengths. One factor contributing to this versatility is that the inner diameter of the tubular frame member is made sufficiently large to house a brake cable system extending from the steering arm substantially the length of the carriage in which position the cable system is also protected from the weather and damage. The article supports consist of one or more tiers of complementary casting halves between which each article is clamped during storage and/or transporting and releasable by quick-detachable locking means.

An important object of this invention is to provide a braking system for a dolly that is instantly operable throughout the vertical displacement of the respective wheel to the carriage, whenever the dolly is left unattended.

Another object is to provide a spring-loaded brake mechanism suitable for a manually-drawn dolly.

Further objects are to provide a brake mechanism that is simple and inexpensive.

Other objects and many of the attendant advantages of this invention will be readily appreciated as the same become better understood by reference to the following detailed description when considered in connection with the accompanying drawings wherein:

FIG. 2 is an enlarged elevation view of the front end of the carriage, partly in section to show the details of the steering and braking assembly;

FIG. 3 is an enlarged front elevation of the steering arm and associated brake cam;

FIG. 5 is a rear elevation view of a rear wheel partially in section to show the brake shoe assembly, wheel mounting, and actuating cable system.

Figure 1:
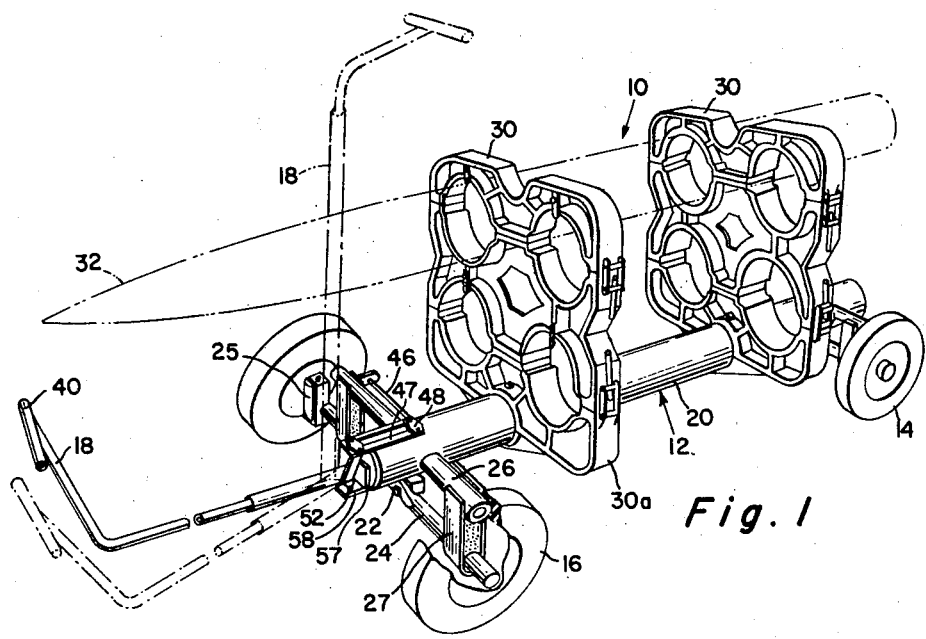
FIG. 1 is a top perspective view of the invention dolly designed to transport four missiles, the steering arm being shown in phantom lines in the two braking zones and in solid lines in the normal towing position.

Referring to the drawing where like reference numerals refer to similar parts throughout the several views, there is shown in FIG. 1, a dolly 10 comprising a chassis including a frame 12 and a plurality of wheels, preferably consisting of a pair of rear wheels 14 and a pair of front wheels 16. Frame 12 includes a longitudinal central beam 20 to which is independently pivoted at 22 an axle 24 of each wheel (see FIGS. 1 and 4). Front wheels 16 are pivotally supported at 25 on their respective axles in a conventional manner and are controlled by a steering arm 18 through linkage presently to be described. Integrally connected to the central beam 20 are transverse beams 26 extending parallel to and above each axle 24 and lying in a common vertical plane, each transverse beam 26 being provided with an integral U-shaped bracket 27 through which passes the respective axle. A rubber cushion 28 is positioned within each bracket between transverse beam 26 and axle 24 providing a spring mount and shock absorber for the respective wheels (see FIG. 5). Longitudinal beam 20 and transverse beams 26 are preferably tubular in construction, to form a housing for a brake cable system in a manner that will be described hereinafter.

A pair of perforated castings 30 are detachably mounted on longitudinal beam 20 in spaced relation to support the articles therebetween, for example, a guided missile 32 to be transported.

An important feature of the invention dolly resides in the braking system and controls therefor that automatically lock the wheels when the dolly is left unattended, either intentionally or accidentally. The brake control is incorporated in steering arm 18 so that the brakes are actuated whenever the arm assumes a predetermined elevation above or below a towing zone, i.e., the positions the arm normally assume during pulling and steering the dolly. In the preferred embodiment the brake system is biased to a braking condition being restrained by the steering arm in a normal towing position. Movement of the steering arm to an unattended position in either direction from the normal towing position releases the braking force to apply the brakes and secure the dolly.

The steering function of arm 18 will be described first followed by a description of the manner in which the braking control function is combined therewith. The end of steering arm 18 opposite handle portion 40 is provided with a pair of spaced upstanding ears 42 (FIGS. 2 and 3) pivotally mounted for movement in a vertical plane by a pin 43 to a vertical hub 44, the entire assembly being suspended from a plate 45 secured on the forward end of frame beam 20. It is obvious that the steering arm is unbalanced and will fall to the ground from a towing position when released by the operator. Rotation of hub 44 in either direction about a vertical axis, drives a tie rod assembly 46 (FIG. 4) to turn the front wheels in the corresponding direction through a parallel steering linkage 47, vertical shaft 48, and oscillatory arm 50 (FIG. 2). Movement of steering arm in a horizontal plane is limited by stops 45a adapted to engage a pin 45b extending through hub 44. The steering linkage is protected by a cover 51.

The brake control comprises basically a cam and follower, and in the preferred embodiment illustrated in FIGS. 2 and 3, a cam 52 is integrally secured to the underside of arm 18 at the pivoted end. The cam has a generally semicylindrical transverse cam surface 54 provided with an intermediate high point lying approximately in a plane normal to the arm 18 and passing through steering arm pivot pin 43, and a low point on each side thereof. A cam follower 56, constructed as a captured ball bearing, is mounted on one end of a bell crank 58 hinged at 57 to a frame extension 55 the other end of the bellcrank being connected to a brake cable system 59 presently to be described. Cam follower 56 is disposed in a vertical axis passing through hub 44 so that the follower remains in engagement with the cam surface at the same relative position regardless of the horizontal steering position of arm 18. Cam surface 54 can be formed with a slot having concave-sectional configuration complementary to the ball bearing cam follower to ensure that the surfaces remain in engagement through any vertical or horizontal operating movement of the steering arm. Because of the particular design, follower 56 will ride off the end of cam surface when the steering arm is elevated in the uppermost elevations, however, the cam and the follower are readily re-engageable when the arm is lowered. This construction may be utilized, as a matter of convenience, as a detent to restrain the arm in this upper braking position, which position would be most convenient for intentional braking by the operator. Otherwise, the movement on the arm will swing it to the lower braking position (so-called "dead-man" position), which may be about 15° below the horizontal, a position the steering arm will assume if the operator is incapacitated while pulling the dolly and releases the arm (FIG. 1). When this event occurs the unattended dolly is immediately and automatically braked to a secured position, preventing an otherwise uncontrolled movement with danger to other personnel, equipment and loss of missiles.

Figure 4:
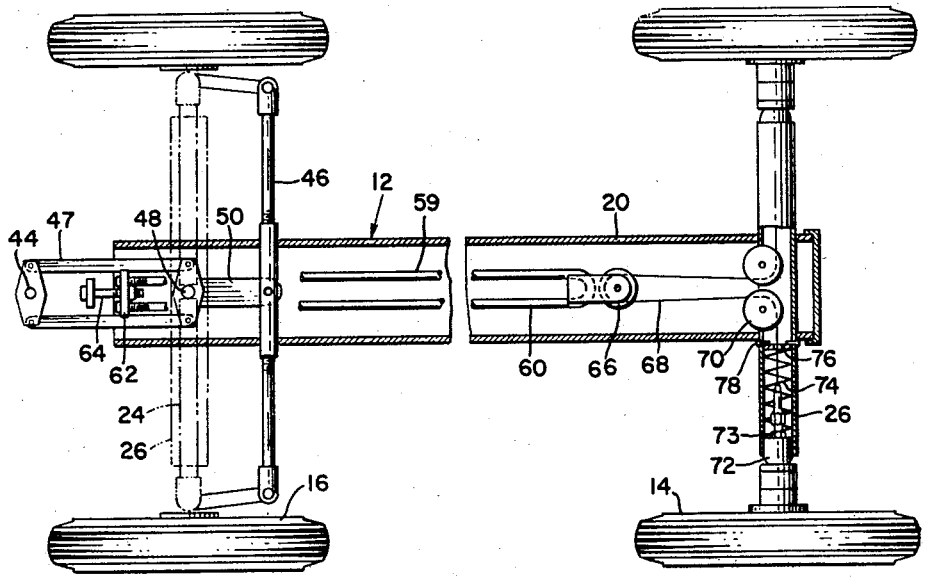
FIG. 4 is a top plan view of the carriage partly in section, with the missile supports removed.
Figure 6:
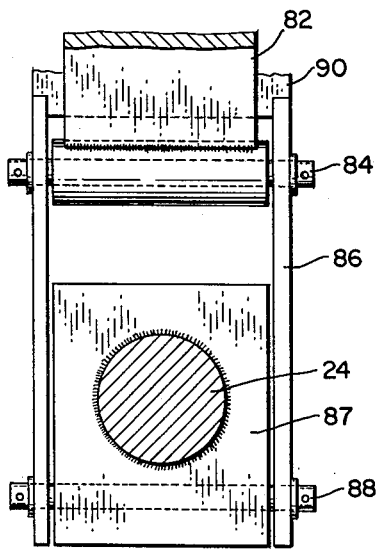
FIG. 6 is a partial side view taken axially in FIG. 5 with the wheel removed.

The remainder of the brake system is shown in FIGS. 2, 4 and 5 and comprises cable system 59 through which the steering arm controls the brakes of rear pair of wheels. It is obvious that a similar arrangement can also be utilized on the front wheels if additional braking force is needed.

The brake cable system includes a U-shaped tensioner 60, the legs of which are anchored to a plate 62 secured to bell crank 58 through a tie bolt 64, whereby the length and the tension of the cable system may be adjusted. Tensioner 60 extends longitudinally through the interior of beam 20 and supports at its base end a pulley 66 supporting a cable 68, each end of the cable being connected around a pulley 70 to a respective plunger 72. Cable 68 is connected to the plunger through a nut 73 which also provides another adjustment in the cable system. Each rear wheel is identical in construction and therefore the same description applies to both rear wheels. Each plunger 72 is slidably housed in a corresponding transverse tubular beam 26, the plunger being provided at the free end with a rounded bearing surface adapted to project through and beyond the open end of the transverse beam to actuate the respective brake shoe as presently to be described. As shown in FIG. 5, each plunger is backed by a compression coil spring 74 retained at the other end by a washer plate 76 secured within the beam by stops 78. Spring 74 biases the plunger to an extended and braking position, the spring being restrained during towing by the steering arm and cam 52 through the cable system.

Referring to FIG. 5, each rear wheel 14 is provided with a brake mechanism comprising a brake shoe 80 adapted to engage a beveled inside wheel rim surface 81, the shoe being supported by an adjustable arm 82 hinged at 84 intermediately a support 86. Support 86 in turn is hinged at 88 to the respective wheel axle, the other end of the support being provided with an integral extension 90 canted from the vertical and adapted to slidably engage and be actuated by plunger 72 throughout any vertical displacement of the wheel as permitted by shock absorber 28. Extension 90 and support 86 form, in effect, a rigid obtuse-shaped bell crank, arm 82 being hinged to the apex of the bell crank at 84 in angular relation to form the other arm of a Y construction. The brakes are applied by the operator releasing the brake cable system enabling plunger 72, under spring pressure, to displace bracket 86 and hinge 84 counterclockwise against the action of tension spring 89, and forcing arm 82 and the brake shoe primarily upwardly against rim surface 81.

The operation of the dolly is apparent from the above description. When steering arm 18 is in the intermediate zone, i.e., towing elevation shown in solid lines in FIG. 1, the dolly is in free wheeling and towable at will. In the "brake-off" position, spring 74 is compressed by the cable system permitting spring 89 to pull support lever 86 away from the wheel pivoting about 88. Support lever 86 is prevented from rotation about the shaft by block 87 welded to shaft 24. Clockwise movement of 86 withdraws arm 82 and its associated brake shoe 80 away from the brake drum 81. In the "brake-off" position, arm 82 and shoe 80 ride freely with only the edge of shoe 80 bearing lightly against the wheel due to its own weight. Arm 82 and support lever 86 form in effect an extendable linkage. The dolly is automatically braked to a secured condition when the steering arm is positioned in either one of two end zones of its travel, shown in phantom lines in FIG. 1, which occurs when the steering arm is accidentally released and falls below a horizontal position, or when the steering arm is elevated above the towing position, which may be the case if the operator desires to intentionally brake the vehicle. As is apparent, the same result is achieved in either case, although it appears that in most situations the elevated position is more convenient. Some adjustment of the braking positions of the steering arm can be achieved by varying the length of the cable system either by tie bolt 64 or nut 73.

The invention provides a spring-loaded brake system that is operable instantly whenever the steering arm of the dolly is in a predetermined position. The brake will be applied in all positions of the wheel, i.e., even though it might be elevated when traversing an object, such as a water hose on the deck of a ship.

Obviously many modifications and variations of the present invention are possible in the light of the above teachings. It is therefore to be understood that within the scope of the appended claims the invention may be practiced otherwise than as specifically described.

I claim:

1. In combination with a vehicle frame, a plurality of wheels, at least two of said wheels each having an axle pivotally supported on said frame for vertical movement relative thereto, each of said wheels having a brake drum, a brake mechanism for braking each of said wheels in any position throughout said vertical movement, comprising extendable linkage, said linkage for each of said wheels including a vertically extending support lever pivotally mounted on a respective axle at its lower end adjacent the respective wheel, said support lever having an upper end, an arm pivotally mounted at one end to the lever at a point intermediate the ends of the support lever, another end of the arm supporting a brake shoe for engagement with the respective brake drum, said arm forming an obtuse angle with respect to its support lever, said arm being pivotable relative to the lever to vary the angular relation therebetween and the combined length of the lever and the arm, horizontally movable means supported on the frame adjacent the support lever and slidably engaging the upper end of the support lever for applying a force to said linkage to engage the respective brake shoe and drum, said upper end of the support lever extending a length greater than the vertical movement of the wheel whereby said movable means can apply a force on the upper end of the support lever throughout the vertical movement of the wheel to extend the combined length of the support lever and the arm to apply a braking force to the respective wheel.

2. In combination with a vehicle frame, a plurality of wheels, at least two of said wheels each having an axle pivotally supported on said frame for vertical movement relative thereto, each of said wheels having a brake drum, a brake mechanism for braking each of said wheels in any position throughout said vertical movement, comprising extendable linkage, said linkage for each of said wheels including a vertically extending support lever pivotally mounted on a respective axle at its lower end adjacent the respective wheel, said support lever having an upper end being an integral extension thereof and forming the lever into a rigid obtuse-shaped bell crank, an arm pivotally mounted at one end to an apex of the bell crank, another end of the arm supporting a brake shoe for engagement with the respective brake drum, said arm forming an obtuse angle with respect to its support lever, said arm being pivotable relative to the lever to vary the angular relation therebetween and the combined length of the lever and the arm, horizontally movable means supported on the frame adjacent the support lever and slidably engaging the upper end of the support lever for applying a force to said linkage to engage the respective brake shoe and drum, said upper end of the support lever extending a length greater than the vertical movement of the wheel, whereby said movable means can apply a force on the upper end of the support lever throughout the vertical movement of the wheel to extend the combined length of the support lever and the arm to apply a braking force to the respective wheel.

3. In combination with a vehicle frame, a plurality of wheels, at least two of said wheels each having an axle pivotally supported on said frame for vertical movement relative thereto, each of said wheels having a brake drum, a brake mechanism for braking each of said wheels in any position throughout said vertical movement, comprising extendable linkage, said linkage for each of said wheels including a vertically extending support lever pivotally mounted on a respective axle at its lower end adjacent the respective wheel, said support lever having an upper end being an integral extension thereof and forming the lever into a rigid obtuse-shaped bell crank, an arm pivotally mounted at one end to an apex of the bell crank, another end of the arm supporting a brake shoe for engagement with the respective brake drum, said arm forming an obtuse angle with respect to its support lever, said arm being pivotable relative to the lever to vary the angular relation therebetween and the combined length of the lever and the arm, a spring-biased horizontally movable plunger supported on the frame adjacent the support lever and having a bearing surface for slidably engaging the upper end of the support lever for applying a force to said linkage to engage the respective brake shoe and drum, said upper end of the support lever extending a length greater than the vertical movement of the wheel whereby said plunger can apply a force on the upper end of the support lever throughout the vertical movement of the wheel to extend the combined length of the support lever and the arm to apply a braking force to the respective wheel.

References Cited in the file of this patent

UNITED STATES PATENTS

| | | |
|---|---|---|
| 1,085,573 | Adams | Jan. 27, 1914 |
| 1,141,100 | Braun | June 1, 1915 |
| 1,331,513 | Lindberg | Feb. 24, 1920 |
| 1,422,285 | Majors | July 11, 1922 |
| 1,437,220 | Birkigt | Nov. 28, 1922 |
| 1,731,499 | Myers | Oct. 15, 1929 |
| 1,961,798 | Sneed | June 5, 1934 |
| 2,050,251 | Alexander | Aug. 11, 1936 |
| 2,788,093 | Steinberg | Apr. 9, 1957 |
| 2,806,713 | Muller | Sept. 17, 1957 |
| 3,005,640 | Cole | Oct. 24, 1961 |

FOREIGN PATENTS

| | | |
|---|---|---|
| 188,106 | Great Britain | Nov. 9, 1922 |